United States Patent Office 3,313,771
Patented Apr. 11, 1967

3,313,771
ALPHA-PHENYLSULFONYL CINNAMATES AND CINNAMONITRILES AS ULTRAVIOLET LIGHT STABILIZERS FOR PLASTIC MATERIALS
Hans Dressler, Pitcairn, and Kenneth G. Reabe, Delmont, Pa., assignors to Koppers Company, Inc., a corporation of Delaware
No Drawing. Filed Feb. 16, 1965, Ser. No. 433,216
9 Claims. (Cl. 260—45.85)

This invention relates to ultraviolet light stabilizers for plastics. In one specific aspect it relates to plastic compositions stabilized against degradation resulting from exposure to ultraviolet radiation. This application is a continuation-in-part of our copending application Ser. No. 375,924, filed June 17, 1964, now abandoned.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

In recent years organic compounds have become available which can absorb ultraviolet light and convert it to less harmful forms of energy, such as heat, vibrational energy, or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity, especially for stabilizing plastics used in the food industry.

As a general rule, an effective ultraviolet light stabilizer should have a molar extinction coefficient ($\epsilon$) of about 10,000; that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons. One disadvantage of presently available commercial stabilizers is that their extinction coefficient is too low over a broad band in the ultraviolet light region to be effective for general use.

Quite surprisingly, we have discovered that certain arylvinylsulfone derivatives are compatible with a large number of plastic materials and exhibit outstanding ultraviolet light absorbing properties over a wide range. These compounds do not impart any substantial color to transparent, colorless plastics.

It is therefore an object of the present invention to provide a composition which is resistant to degradation by ultraviolet radiation.

It is another object of the present invention to provide plastic compositions containing the arylvinylsulfone derivatives which are substantially resistant to ultraviolet deterioration.

In accordance with the present invention, we have discovered that derivatives of arylvinylsulfones are particularly useful as ultraviolet light stabilizing agents for plastic materials.

Useful arylvinylsulfones are compounds having the formula:

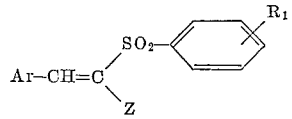

In the above formula $R_1$ is hydrogen or an alkyl radical having from 1–4 carbon atoms. Z is —CN or —COOR$_2$ wherein $R_2$ is an alkyl radical having from 1–18 carbon atoms. Ar is either.

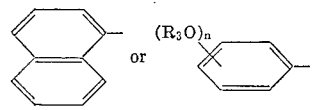

wherein $R_3$ is an alkyl radical having from 1–4 carbon atoms and $n$ is an integer having a value of 1 or 2; the value of $n$ being dependent on the value of Z. If Z is —CN, then $n$ is 1, and if Z is —COOR$_2$, $n$ can be 1 or 2.

The ultraviolet light stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the ultraviolet light-absorbing agent in an appropriate solvent, such as hexane or benzene. It is also possible to incorporate the ultraviolet light-absorbing agent in a finished article by introducing the plastic material into a bath containing the ultraviolet light-absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique.

The plastic material should contain a stabilizing amount of the ultraviolet light-absorbing agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation to numerous plastic materials which are sensitive to ultraviolet light. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure. The ultraviolet stabilizer is effective for protecting polyethylene, polypropylene, polystyrene, polyvinyl acetate, polyvinyl chloride, copolymers of vinyl chloride and vinylidene chloride, cellulose resins, such as nitrocellulose, ethylcellulose, and cellulose acetate, and numerous other materials. The agent can be used alone or together with other additives, such as fillers, antioxidants, pigments, etc.

The agents of the invention are particularly effective when used in combination with a phenolic antioxidant, in particular an alkylphenol, bis-phenol, or phenol sulfide. Useful phenolic antioxidants thus include di-t-butyl-p-cresol, o-nonylphenol, o,o'-diisopropylphenol, 2,2'-methylene-bis(4-methyl-6-isopropylphenol), 2,2'-methylene-bis(4-t-butyl-6-methylphenol), 4,4'-methylene-bis(2-methyl-6-t-butylphenol), 2,2'-ethylidene-bis(4,6-di-t-butylphenol), 4,4'-butylidene-bis(6-t-butyl-m-cresol), 4,4'-thio-bis(6-t-butyl-m-cresol), and the like. The phenolic antioxidant should be present in an amount ranging between 0.01 and 5 percent by weight, based on the weight of the polymeric composition.

This invention is further illustrated by the following examples:

*Example I*

A mixture of 7.2 g. (0.04 m.) of cyanomethylphenylsulfone, 6.8 g. (0.05 m.) of anisaldehyde, and 40 ml. of isopropanol was warmed to obtain a clear solution. To this was added a catalytic amount of piperidine and the mixture was allowed to stand overnight, then filtered to give 10.3 g. (84% yield) of colorless solids, M.P. 113–115° C. After recrystallization from 50/50 isopropanol/toluene, M.P. 114.5–116° C., the mixture M.P. with cyanomethylphenylsulfone was 85–87° C. The infrared spectrum confirmed that the product was p-methoxy-alpha-(phenylsulfonyl)cinnamonitrile, which has the structural formula:

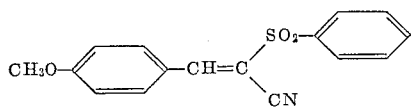

The product is an excellent ultraviolet light stabilizer. It has a molar extinction coefficient of log ε equal to or greater than 4.0 in the spectral range of 290–345 millimicrons.

*Example II*

A mixture of 5.2 g. (0.025 m.) of ethyl phenylsulfonylacetate, 3.4 g. (0.025 m.) of anisaldehyde, 20 ml. of isopropnol, and a catalytic amount of piperidine was warmed slightly to get a clear solution. After standing for four hours, no precipitate had formed. The solution was evaporated to dryness on the steam bath, then evaporation was continued under vacuum to give 9.0 g. of a pale yellow oil. This gave a soft solid which was digested in 200 ml. of isopropanol and filtered to give 4.8 g. of colorless solid, ethyl p-methoxy-alpha-(phenylsulfonyl)cinnamate, M.P. 92–102° C.; after crystallization from 95% ethanol, 3.3 g. (41% yield), M.P. 106–107° C.

The infrared spectrum of the product confirmed the structural formula:

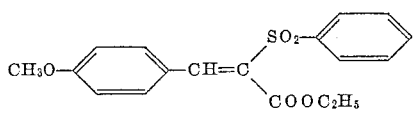

The product is an excellent ultraviolet light stabilizer. It has a molar extinction coefficient of log ε equal to or greater than 4.0 in the spectral range of 290–345 millimicrons.

*Example III*

The products of Example I, p-methoxy-alpha-(phenylsulfonyl)cinnamonitrile, and Example II, ethyl p-methoxy-alpha-(phenylsulfonyl)cinnamate, were tested to determine their ability to stabilize polystyrene against ultraviolet light degradation. The stabilizers in an amount of 0.1 part by weight were blended with 100 parts of polystyrene beads by rolling in a jar mill. The stabilized bead samples and a control sample were extruded into pellets from which discs two inches in diameter and ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below:

TABLE I

| Stabilizer | Weight Percent | Yellowness Factor |
| --- | --- | --- |
| p-Methoxy-alpha-(phenylsulfonyl) cinnamonitrile | 0.1 | 2.8 |
| Ethyl p-methoxy-alpha-(phenylsulfonyl) cinnamate | 0.1 | 0.6 |
| Control | None | 6.9 |

*Example V*

A mixture of 8.4 g. (0.05 m.) of 2,4-dimethoxybenzaldehyde, 11.4 g. (0.05 m.) of ethyl (phenylsulfonyl)acetate, 50 ml. of benzene, and three drops of piperidine was refluxed for 18 hours under a Dean-Stark apparatus. During this time, 1.0 ml. of water was removed. The mixture was then evaporated to leave an oil which crystallized slowly. After recrystallization from 95% ethanol with activated treatment, 14.3 g. of practically colorless solid, M.P. 95.0–95.5° C. was obtained. The infrared spectrum supported the proposed structure of the product, ethyl o,p-dimethoxy-alpha-(phenylsulfonyl)cinnamate:

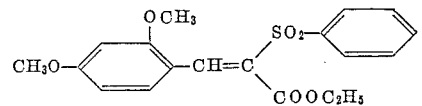

*Example VI*

A mixture of 12.6 g. (0.06 m.) of ethyl (phenylsulfonyl)acetate, 9.4 g. (0.06 m.) of 1-naphthaldehyde, 20 ml. absolute ethanol, and three drops of piperidine was held near the boiling point for three hours, then evaporated to dryness. The waxy residue was crystallized from benzene to give 9.8 g. of colorless solid product, M.P. 159–161° C.

*Analysis.*—Calcd. for $C_{21}H_{18}O_4S$: S, 8.7; Found: S, 8.5; ethyl 1-naphthalene-alpha-(phenylsulfonyl)acrylate, corresponding to the proposed structure:

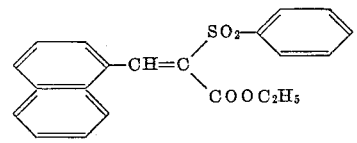

*Example VII*

A mixture of 9.8 g. (0.04 m.) of ethyl (p-toluenesulfonyl)acetate, 5.6 g. (0.04 m.) of o-methoxybenzaldehyde, 20 ml. of absolute alcohol and three drops of piperidine was kept near the boiling point for four hours, then evaporated to dryness. The oily residue was triturated with 95% ethanol and filtered to give 6.8 g. of ethyl o-methoxy-alpha-(p-toluenesulfonyl)cinnamate, as a colorless solid, M.P. 78–79° C.

*Analysis.*—Calcd. for $C_{19}H_{20}O_5S$: S, 9.1; Found: S, 8.5.

*Example VIII*

A mixture of 3.5 g. (0.02 m.) of (phenylsulfonyl)acetonitrile, 2.6 g. (0.02 m.) of o-methoxybenzaldehyde, 20 ml. of absolute ethanol, and 0.5 g. of potassium t-butylate was boiled for ten minutes, then cooled to 25° C. and filtered to give pale yellowish solids, M.P. 111–114° C. The expected structure of the product, o-methoxy-alpha-(phenylsulfonyl)cinnamonitrile, was corroborated by its infrared spectrum.

Example IX

A mixture of 5.3 g. (0.025 m.) of (p-toluenesulfonyl) acetonitrile, 20 ml. of toluene, 4.0 g. (0.025 m.) of o-ethoxybenzaldehyde, and two drops of piperidine was kept at 80° C. for four hours, then evaporated to dryness. The residue was recrystallized from toluene with activated carbon treatment to give 6.8 g. of almost colorless solid product, o - ethoxy - alpha - (p - toluenesulfonyl)cinnamonitrile, M.P. 131–133° C.

*Analysis.*—Calcd. for $C_{18}H_{17}NO_3S$: S, 9.8. Found: S, 10.0, corresponding to the proposed structure:

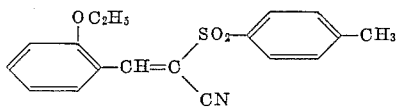

Example X

The products of Examples V, VI, VII, VIII, and IX were tested to determine their ability to stabilize polystyrene against ultraviolet light degradation according to the procedure of Example III. By following the appropriate procedures of the foregoing preparative examples, p - methoxy - alpha - (p - toluenesulfonyl)cinnamonitrile, o - ethoxy - alpha - (phenylsulfonyl)cinnamonitrile, ethyl m,p - diethoxy - alpha - (phenylsulfonyl)cinnamate, ethyl o - methoxy - alpha - (phenylsulfonyl)cinnamate, m,p-diethoxy - alpha - (phenylsulfonyl)cinnamonitrile, o,p-dimethoxy - alpha - (phenylsulfonyl)cinnamonitrile, alpha-(phenylsulfonylcinnamonitrile were also made for evaluation purposes. The results of the U.V. light stabilization tests are shown in Table II.

TABLE II

| Stabilizer | Weight Percent | Yellowness Factor |
|---|---|---|
| Control | 0 | 6.9 |
| Ethyl o,p-dimethoxy-alpha-(phenylsulfonyl) cinnamate | 0.1 | 0.1 |
| Ethyl 1-naphthalene-alpha-(phenylsulfonyl) arcylate | 0.1 | 0.3 |
| Ethyl o-methoxy-alpha-(p-toluenesulfonyl) cinnamate | 0.1 | 0.4 |
| o-Methoxy-alpha-(phenylsulfonyl) cinnamonitrile | 0.1 | 1.0 |
| o-Ethoxy-alpha-(p-toluene-sulfonyl) cinnamonitrile | 0.1 | 0.6 |
| p-Methoxy-alpha-(p-toluene-sulfonyl) cinnamonitrile | 0.1 | 0.3 |
| o-Ethoxy-alpha-(phenylsulfonyl)-cinnamonitrile | 0.1 | 0.8 |
| Ethyl m,p-diethoxy-alpha-(phenylsulfonyl) cinnamate | 0.1 | 1.0 |
| Ethyl o-methoxy-alpha-(phenylsulfonyl) cinnamate | 0.1 | 0.1 |
| m,p-Diethoxy-alpha-(phenylsulfonyl)-cinnamonitrile | 0.1 | 4.0 |
| o,p-Dimethoxy-alpha-(phenylsulfonyl)-cinnamonitrile | 0.1 | 4.5 |
| Alpha-(phenylsulfonyl) cinnamonitrile | 0.1 | 7.1 |

A yellowness factor of less than 3 is considered to be good, a factor of one or less is considered to be excellent. It is thus seen that the majority of compounds useful in the invention are excellent ultraviolet light stabilizing agents when used in polystyrene. Surprisingly, the unsubstituted alpha - (phenylsulfonyl)cinnamonitrile has no effect as a light-screening agent. The cinnamonitriles having one phenyl lower alkoxy substituent are good to excellent light-screening agents, whereas those having two alkoxy substituents on the aryl nucleus are fair to poor. In surprising contrast, the cinnamates having two alkoxy substituents on the aryl nucleus are excellent ultraviolet light stabilizers for polystyrene.

Example XI

The product of Example II, ethyl p-methoxy-alpha-(phenylsulfonyl)cinnamate, was evaluated in polypropylene as a stabilizer against ultraviolet light degradation. A polypropylene disc was prepared containing 1.0 percent by weight of ethyl p-methoxy-alpha-(phenylsulfonyl)cinnamate along with a control disc containing no ultraviolet light stabilizer. The results are shown in Table III.

TABLE III

| Stabilizer | U.V. Irradiation Time in Hours to— | | |
|---|---|---|---|
| | First Crazing | First Embrittlement | Crumbling |
| Control | 120 | 168 | 340 |
| Ethyl p-methoxy-alpha-(phenylsulfonyl)cinnamate | 120 | 340 | 936 |

Example XII

Two polyester test specimens were made using sixty parts by weight maleic anhydride-phthalic anhydride-propylene glycol polyester resin, forty parts by weight styrene, and one percent benzoyl peroxide. In addition, one of the specimens contained 0.5 percent by weight ethyl p-methoxy-alpha-(phenylsulfonyl)cinnamate. Clear castings were cured at 60–150° C. After one thousand hours irradiation, the tested specimen showed a yellowness factor of 2.6, in marked contrast with the control of 15.3.

Example XIII

One part of p-methoxy-alpha-(phenylsulfonyl)cinnamonitrile was blended with 100 parts of low density polyethylene and 0.05 part 4,4'-thio-bis(6-t-butyl-m-cresol) by milling on a two roll mill at 320° F. for five minutes. Another sample was prepared by blending one part of ethyl p-methoxy - alpha - (phenylsulfonyl)cinnamate with 100 parts of low density polyethylene. The clear thin films, 0.05 mm. thick, were molded from the stabilized resins and visual inspection indicated that the resins and the stabilizer were completely compatible. These films were exposed for 500 hours to the light of an ultraviolet lamp. The stabilized films remained substantially unchanged and no embrittlement could be ascertained, while an unstabilized film used as a control showed discoloration and embrittlement.

Similar results are obtained when polypropylene, copolymers of vinylidene chloride, and vinyl chloride, or styrene-modified maleic-glycol polyesters are used in the foregoing example.

Excellent results are also obtained using dodecyl-alpha-(phenylsulfonyl)-p-methoxycinnamate and octadecyl-alpha-(phenylsulfonyl)-p-methoxycinnamate according to the procedure of the foregoing example.

We claim:

1. A polymeric composition stabilized against ultraviolet degradation comprising a polymer selected from the group consisting of polyethylene, polypropylene, polystyrene, polyvinyl acetate, polyvinyl chloride, copolymers of vinylidene chloride and vinyl chloride, nitrocellulose, ethylcellulose, cellulose acetate and polyester resins and containing a stabilizer having the formula:

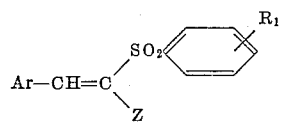

wherein $R_1$ is a member selected from the group consisting of hydrogen and alkyl radicals having from 1–4 carbon atoms; Z is a member selected from the group consisting of cyano and —$COOR_2$, wherein $R_2$ is an alkyl radical having from 1–18 carbon atoms; Ar is a member selected from the group consisting of:

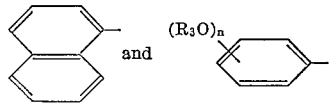

wherein $R_3$ is an alkyl radical having from 1–4 carbon atoms and $n$ is an integer having a value of 1–2, the value of $n$ being 1 when Z is cyano.

2. A polystyrene composition stabilized against degradation on exposure to ultraviolet radiation comprising polystyrene having dispersed therein a stabilizing amount of lower alkyl (alpha-phenylsulfonyl)-p-alkoxycinnamate.

3. The polymeric composition of claim 1 wherein the amount of stabilizer is 0.01 to 5 percent by weight of said polymer.

4. A polystyrene composition stabilized against degradation on exposure to ultraviolet radiation comprising polystyrene having dispersed therein a stabilizing amount of ethyl o,p-dimethoxy-alpha-(phenylsulfonyl)cinnamate.

5. A polystyrene composition stabilized against degradation on exposure to ultraviolet radiation comprising polystyrene having dispersed therein a stabilizing amount of ethyl 1-naphthalene-alpha-(phenylsulfonyl)acrylate.

6. A polystyrene composition stabilized against degradation on exposure to ultraviolet radiation comprising polystyrene having dispersed therein a stabilizing amount of ethyl o-methoxy-alpha-(phenylsulfonyl)cinnamate.

7. A polystyrene composition stabilized against degradation on exposure to ultraviolet radiation comprising polystyrene having dispersed therein a stabilizing amount of p-methoxy-alpha-(p-toluenesulfonyl)cinnamonitrile.

8. A polypropylene composition stabilized against degradation on exposure to ultraviolet radiation comprising polypropylene having dispersed therein a stabilizing amount of ethyl p-methoxy-(alpha-phenylsulfonyl)cinnamate.

9. A polyester composition stabilized against degradation on exposure to ultraviolet radiation comprising a polyester resin having dispersed therein a stabilizing amount of ethyl p-methoxy-(alpha-phenylsulfonyl)cinnamate.

No references cited.

DONALD CZAJA, *Primary Examiner.*

LEON J. BERCOVITZ, *Examiner.*

V. P. HOKE, *Assistant Examiner.*